United States Patent [19]

Mehnert et al.

[11] Patent Number: 4,652,229

[45] Date of Patent: Mar. 24, 1987

[54] APPARATUS FOR THE MANUFACTURE OF TUBULAR PREFORMS OF PLASTICS

[76] Inventors: Johannes Mehnert, Ernstrasse 11, 5205 St. Augustin 3, Menden; Alfred Effenberger, Finkenstr. 4, 7024 Filderstadt, both of Fed. Rep. of Germany

[21] Appl. No.: 802,852

[22] Filed: Nov. 27, 1985

Related U.S. Application Data

[62] Division of Ser. No. 511,514, Jul. 6, 1983, Pat. No. 4,594,212.

[30] Foreign Application Priority Data

Jul. 7, 1982 [DE] Fed. Rep. of Germany ....... 3225567

[51] Int. Cl.$^4$ .............................................. B29C 45/02
[52] U.S. Cl. .................................... 425/528; 264/163; 425/532; 425/577; 425/588

[58] Field of Search ............... 264/523, 537, 539, 540, 264/541, 323, 328.7, 328.11, 328.19, 163, 319; 425/528, 532, 533, 577, 381, 523, 534, 558, 544, 535, 543

[56] References Cited

U.S. PATENT DOCUMENTS 3,751,207  8/1973  Mehnert .............................. 425/535
3,825,389  7/1974  Pott ..................................... 425/543

Primary Examiner—Jay H. Woo
Assistant Examiner—Timothy W. Heitbrink
Attorney, Agent, or Firm—Norman S. Blodgett; Gerry A Blodgett

[57] ABSTRACT

The invention relates to a method for the manufacture of tubular preforms. Its purpose is to improve the flow pattern in the plastics chamber and simultaneously to shorten the dwell time of the plastics. This is achieved, in the course of the dip blow method, by the fact that the geometric form of a plastics chamber (that is distinct from a separate screw chamber) is changed and the volume is decreased so that the tubular preform acquires a certain thickness or thickness distribution.

12 Claims, 9 Drawing Figures

APPARATUS FOR THE MANUFACTURE OF TUBULAR PREFORMS OF PLASTICS

This is a divisional of co-pending application Ser. No. 511,514 filed on July 6, 1983 now U.S. Pat. No. 4,594,212.

BACKGROUND OF THE INVENTION

The present invention relates to a method and equipment for the manufacture of tubular preforms of thermoplastics. The invention particularly relates to equipment that operates according to the so-called "dip blow" process, which is described in the DE-PS No. 1 800 263.

The known dip blow process is carried out so that the preform is formed through the insertion of the blow mandrel by means of relative motion between the mandrel and an outlet nozzle in a chamber filled with softened plastic The subsequent re-emerging of the mandrel carries along the plastics surrounding it.

It has been shown that with this type of equipment no perfectly satisfying method of operation can be achieved, even when the plastics chamber is provided in known manner with an axially slidable plasticizing and conveying screw. Such a screw is advanced on the forward feed of the nozzle-forming sleeve in the plastics chamber in order to obtain an adequate continuity of the plastics flow. Even then the thickness control of the tubular preform is not satisfactory. This is especially true when the preform is to exhibit a particular longitudinal thickness distribution in order to adapt itself to different local forming requirements during a subsequent blow process.

It has been further tried to increase the pressure on the plastics within the plastics chamber by the insertion of a plunger into the plastics chamber in order to bring about a thickness control. But in practice it has consistently been found that a thickness control meeting high requirements cannot be obtained accurately enough by this method. The flow pattern of the plastics in such a plastics chamber is moreover not homogeneous, which fact impairs the method of operation and the quality of the preforms. In the dip blow process, it is necessary to design such a plastics chamber rather long in order to provide sufficient space from the front for the mandrel and from the rear to the plunger. This results in large dimensions of the plastics chamber and leads thereby to a long dwell time of the plastics in the plastics chamber. This is very detrimental in the case of thermally sensitive plastics.

The present invention has as a primary object to improve flow relations and simultaneously to shorten the dwell time of the plastics in the chamber.

These objects are obtained according to the method of the present invention as claimed below.

Additional preferred versions of the method are described and claimed below.

The invention also relates to equipment for carrying out the method of the invention. These preferred embodiments of the invention are characterized individually below.

It is obvious that the equipment described covers only exemplified versions of the method. Thus, naturally, instead of slidable sleeves, the plastics chamber can also have the form of a compressible and expansible bag which carries out the changes in geometric shape of the plastics chamber by the action of an external pressure means or by the creation of partial vacuum in the expansion phase.

The advantage of the present invention resides in the fact that, the change of form of the plastics chamber allows a particularly exact control of the extruded amount of plastics for the tubular preform, without requiring changes in the annular gap of the nozzles.

A particularly advantageous embodiment results when the expansible and contractible plastics chamber consists of essentially only two sleeves; that is, a front and a rear sleeve. It is especially preferred that the rear one, the sleeve facing away from the nozzle, be firmly connected with the screw chamber. A particularly favorable situation results, not only with respect to the flow pattern, but at the same time only a single close sliding fit is needed on relatively small glide surfaces.

BRIEF DESCRIPTION OF THE DRAWINGS

Exemplified embodiments of the invention are illustrated in the following drawings.

DESCRIPTION OF THE PREFERRED EMBODIMENT

Figure 1:
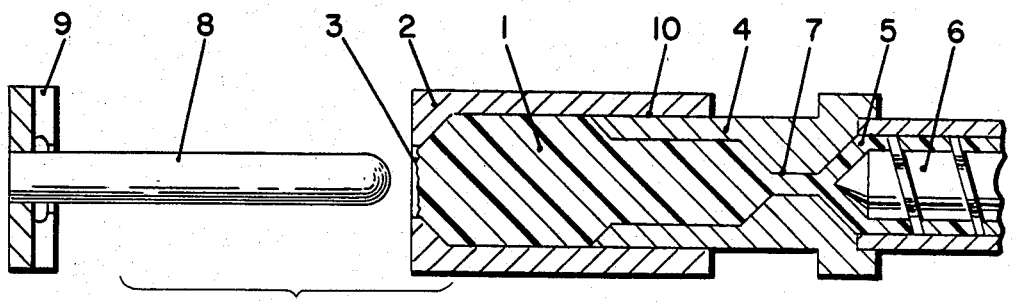
FIGS. 1 to 5 represent five different process phases on an embodiment of the invention.

In the FIGS. 1 to 5 the plastics chamber is denoted by the reference numeral 1. The geometric shape of the plastics chamber 1 is formed by the front sleeve 2 (which displays a nozzle 3 at the exit end of the chamber) and a rear sleeve 4 which is firmly connected with the screw chamber 5. The screw chamber 5, in which is located the screw 6, is connected via a channel 7 with the plastics chamber 1. The mandrel 8 has a rigid position in the embodiment according to FIG. 1 to 5. It is attached to a muzzle tool 9 which serves for the on-forming of a thread or the like. In this embodiment there is a single, close sliding fit 10 between the front sleeve 2 and the rear stationary sleeve 4. The positions illustrated naturally flow into one another. In the interest of clearness, the driving elements have not been depicted.

In FIG. 1 the chamber 1 is filled with plastics and thus takes up a ready position.

Figure 2:
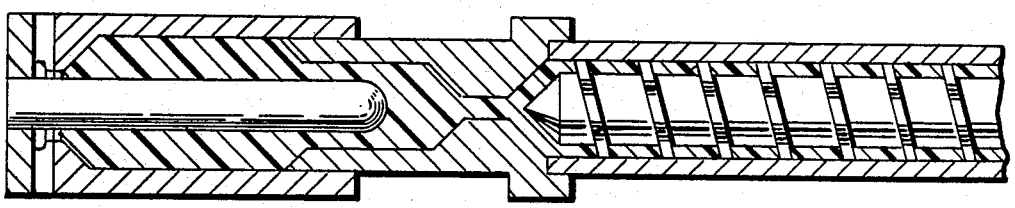

In FIG. 2 the front sleeve 2 and the rear sleeve 4 have moved in the same direction but with different strokes. Because of this, the volume of the chamber 1 is enlarged and the mandrel 8 dips into the plastics without the plastics exiting at the nozzle 3 before the nozzle abuts at the muzzle tool 9.

Figure 3:
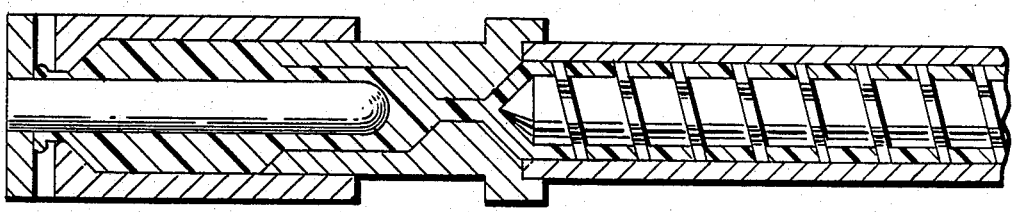

In FIG. 3 the rear sleeve 4 has continued to execute a certain stroke in direction of the mandrel 8, whereby the chamber 1 has become reduced and the plastics fully fills the muzzle tool 9. This squirting-in can also be accomplished through extrusion or also through a combination of extrusion and a corresponding stroke of the rear sleeve 4. After that, the rear sleeve 4 goes back a small stroke in order to relieve the pressure previously applied to the plastics in the chamber 1. This stroke also serves to equalize the volume in the chamber 1 in the case of additional (continuous) extrusion from the screw chamber 5.

Figure 4:
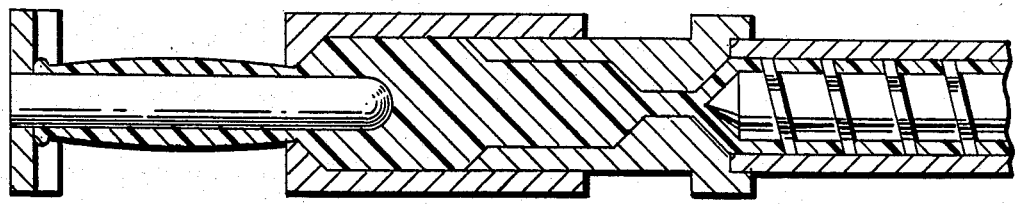

In FIG. 4 the front sleeve 2 and rear sleeve 4 have moved back simultaneously, but with different strokes. The movements of both elements occur in coordination with one another and in accordance with a controllable program so that the preform 11 is formed on the mandrel 8 with an accurately determined wall thickness.

Figure 5:
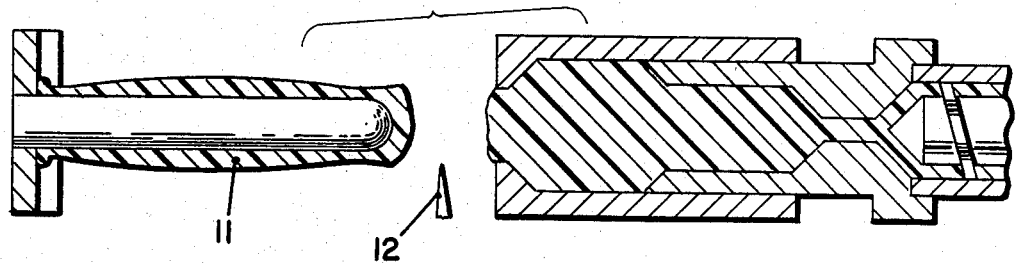

In FIG. 5 the front sleeve has passed the full length of the mandrel 8 and the preform 11 has been separated from the solid strand connecting it with the nozzle 3. The separation can be carried out by the blade 12 or by further simultaneous return movement of front sleeve 2 and rear sleeve 4. By the latter action the plastics strand constricts and tears off.

Figure 6:
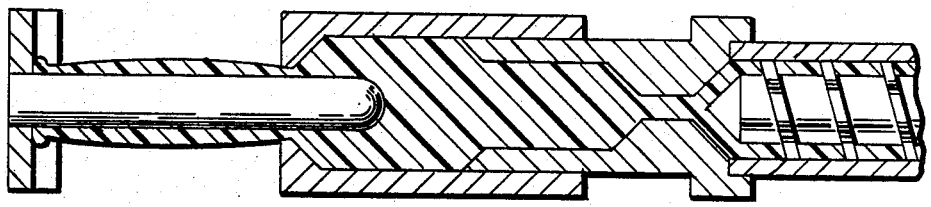
FIGS. 6 and 7 show different embodiments of the invention.
Figure 7:
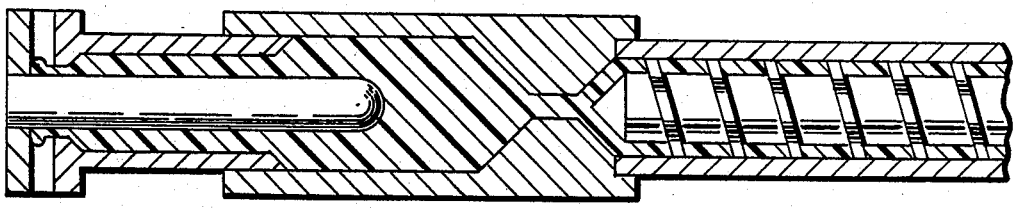

The FIGS. 6 and 7 show two variants of the methods of operation described in the FIGS. 1 to 5. FIG. 6 illustrates equipment where the rear sleeve 4 is stationary and where, in concert with the movable mandrel 8, the front sleeve 2 is moved.

FIG. 7 illustrates equipment where the front sleeve 2 is stationary and where, in concert with the movable mandrel 8, the rear sleeve 4 is moved. In other respects both methods of operation are analogous to the phases described in FIGS. 1 to 5.

FIG. 7 shows an exemplified embodiment where the front sleeve 4 is not located outside, but inside the rear sleeve 4.

The sleeves 2 and 4 are in practice simple turned parts and easily exchangeable. The front sleeve 2 and the rear sleeve 4 can, moreover, be greatly variable in design to suit geometrical wishes (e.g., for certain diameter relations and strokes). The designs are also affected by the type of the plastics to be used and the dimensions of the preforms to be produced.

Figure 8:
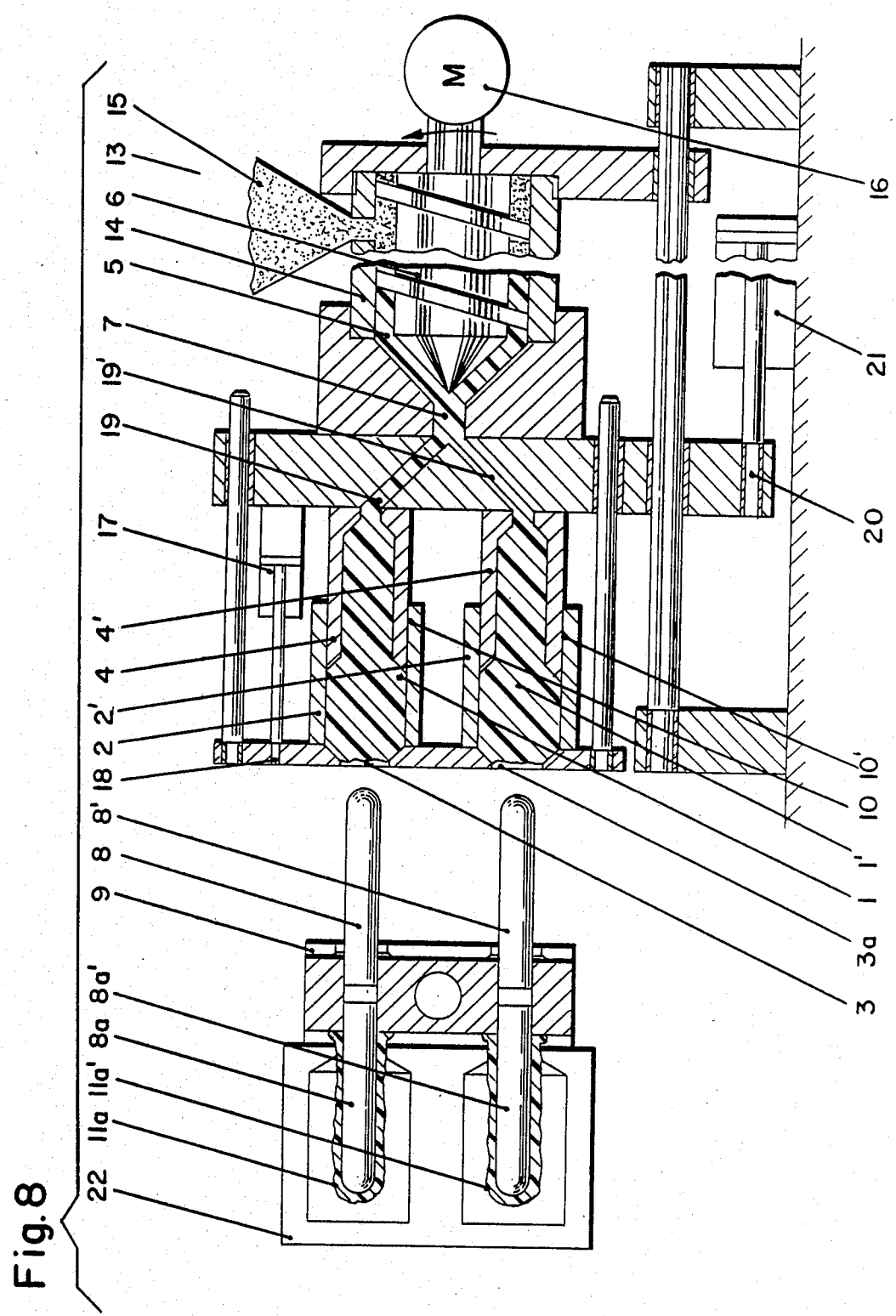
FIGS. 8 and 9 show the diagrams of a machine in the version of FIGS. 1 to 5.

FIG. 8 shows, in diagram, a machine embodying the present invention with its most important parts. The extruder 13 shows, as is customary, a cylinder 14 and a screw 6, whose free space forms a chamber 5. The chamber receives (via the funnel 15) plastics material that is to be plasticized in the chamber 5 and transported away. For this purpose the motor 16 rotates the screw 6.

The volumes of chambers 1 and 1' can be changed by relative motion of the front sleeve (2 or 2') and the rear sleeve (4 or 4'), which together form the close sliding fit (10 or 10'). A linear drive 17 that is firmly connected with the rear sleeves 4 or 4', rests with a movable piston in a seat 18 in the front sleeves 2 or 2' so that the sleeves 2 or 2' and 4 or 4' can be shifted against one another. By this movement the chamber volume is continuously variable.

The rear sleeves 4 or 4' are firmly connected with the extruder 13 via its cylinder 14 The chambers 1 or 1' have constrictions which lead as branch channels 19 or 19' and channel 7 directly to the screw space 5.

Firmly connected with the rear sleeves 4 or 4' is a seat 20 for the piston of a linear drive 21 which is supported in a stationary manner with its cylinder. By this means the rear sleeves 4 or 4' (together with the screw space 5 and the parts surrounding it) can be moved in the direction of the blow mandrel 8 or 8', so that the nozzles 3 or 3' abut at the neck or muzzle tool 9. The method of operation is diagrammatically depicted in the FIGS. 1 to 5 which illustrate the process steps.

A machine of this type can be equipped with one or several cavities. A double arrangement is shown. The blow tool 22 has, accordingly, two cavities and in them the preforms can be widened up into hollow bodies by the introduction of air via the blow mandrels. To remove the finished hollow articles after the cooling, the blow tool 22 is opened.

Not depicted here are details which are essential for blow molding but are a matter of course. These include the air injection for the blow mandrels, the channels required for this, the borings and slots for the air exit, the mandrel holder, the tempering borings of the muzzle tools, the cooling borings of the blow mold; and the heating of the nozzles, of the distributor and of the screw cylinder.

The finished hollow articles can be pulled off after the opening of the blow mold in the blowing position or while the mandrels swing back. In other undepicted embodiments, the mandrel carrier takes up three or four sets of mandrels, whereby the other positions are available for the removal, the tempering of the preforms or of the intermediate hollow bodies, and for the stretching.

The mechanical arrangement is preferably horizontal according to FIG. 8, wherein the mandrels move in a vertical plane. In this way, all elements executing the process are equally far removed from the side of the operator. On smaller machines a space-saving erection with a vertical main axis is possible, while on large machines an angular arrangement towards the extruder is best suited. For example, it may be desirable to have a vertical screw chamber and horizontal plastics chambers, in which case the transition or passage from the screw chamber into the plastics chambers takes place by, and comprises, a tube or pipe offset or bent-off by 90°.

Figure 9:
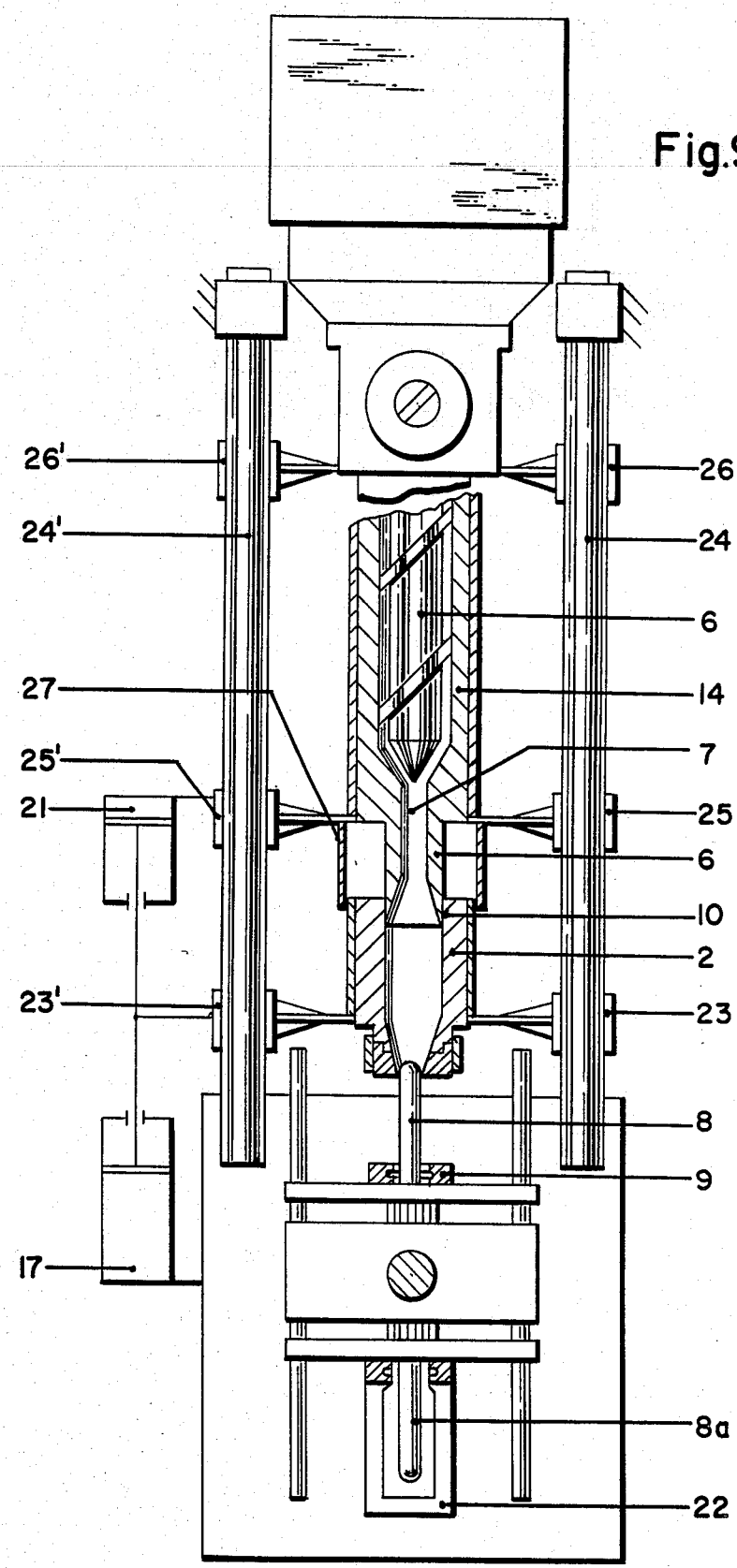

In FIG. 9 a variant is shown in which the slidable elements have a common guide. The sleeves 2 and 4, which are slidable against one another, have guide elements 23, 23' and 25, 25' which are located outside of the thermal region of action of these sleeves.

In this arrangement the spacing between the sleeves 2 and 4 and the guide elements 23, 23' and 25, 25' prevents an impairment of this guidance by the heat prevailing at the sleeves 2 and 4.

A special emphasis should be placed on coaxial guidance for the axial relative motion of the various elements, (sleeves 2 and 4, and screw chamber 14). This object is attained by the fact that the associated guide elements 23, 23', 25 25' and 26, 26' move coaxially on common guides. Particularly suitable for such a common guidance are the parallel-arranged spars 24 and 24' illustrated in FIG. 9. On an extended stroke of the sleeves 2 and 4 (which are movable relative to one another) the exposed telescoping part is shielded by a heat protection shield 27 against undesired heat radiation.

We claim:

1. A device for the manufacturer of tubular preforms of plastics, comprising:
    a plastics chamber having at least two telescoping, close-fitting, co-axial sleeves, said device including
    a front sleeve with a constriction forming an outlet nozzle,
    a rear sleeve having a central feed inlet,
    means of displacing the front and rear sleeves relative to one another to vary the volume enclosed,
    a blow mandrel,
    means of introducing the blow mandrel through the outlet nozzle of the front sleeve,
    means of withdrawing the blow mandrel from the outlet nozzle along with the surrounding plastic,
    a screw chamber separate from the plastics chamber and connected by means of a passage to the central feed inlet of the rear sleeve.

2. A device as recited in claim 1, in which the plastics chamber consists of a front sleeve and a rear sleeve and in which the screw chamber has a housing to which the rear sleeve is firmly connected.

3. A device as recited in claim 1, further comprising means to control the speed of displacement of the sleeves in relation to one another so that the relative speed of the front sleeve toward the rear sleeve corresponds to a predetermined desired pattern of thickness of the tubular preform.

4. A device as recited in claim 3, further comprising means to effect relative movement between an assembly, said assembly en-compassing the plastics chamber and the screw chamber, relative to the blow mandrel.

5. A device as recited in claim 1, wherein the passage from the screw chamber into the plastics chamber comprises a pipe offset by 90°.

6. A device as recited in claim 1, wherein the plastics chamber has internal radial dimensions, and wherein the thickness of the rear sleeve is substantially larger than that of the front sleeve so that a substantial change of the internal radial dimensions of the plastics chamber is obtainable.

7. A device as recited in claim 1, wherein a hydraulic drive is provided to produce relative axial telescoping motions of the front and rear sleeves.

8. A device as recited in claim 1, wherein at least one of the front and rear sleeves is provided with a guide.

9. A device as recited in claim 8, wherein the sleeve guide is located sufficiently distant from at least one of said front and rear sleeves to avoid thermal influence from the sleeve.

10. A device as recited in claim 8, wherein the sleeves have guide elements, the screw chamber has guide elements, and the sleeve guide elements along with the screw chamber guide elements are connected to a common guide.

11. A device as recited in claim 10, wherein the common guide comprises two parallel spars.

12. A device as recited in claim 9, wherein the telescoping, co-axial sleeves are isolated from other parts by a thermal insulation shield.

* * * * *